United States Patent Office 2,972,501
Patented Feb. 21, 1961

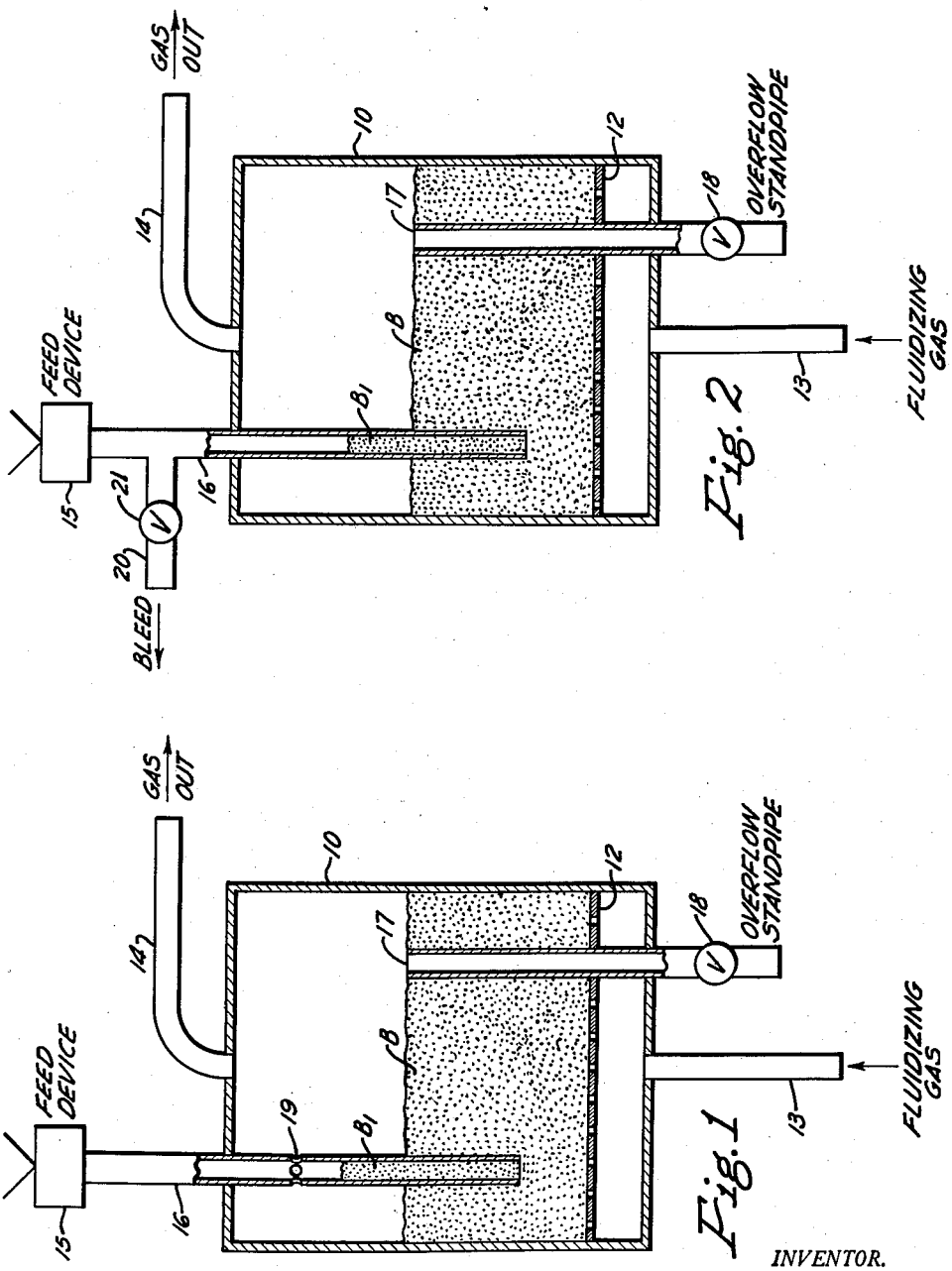

---

2,972,501

DEVICE FOR FEEDING PARTICLES TO FLUIDIZED BEDS

Jerome Feinman, Pitcairn, Pa., assignor to United States Steel Corporation, a corporation of New Jersey Filed May 22, 1959, Ser. No. 815,157

6 Claims. (Cl. 302—29)

This invention relates to an improved device for feeding particles to a fluidized bed.

Conventionally a fluidized bed is supported on a perforate horizontal partition within a closed vessel. Fluidizing gas enters the bottom of the vessel and flows upwardly through the partition and particles supported thereon. In a continuously operated bed, particles commonly enter the bed near the bottom at one side and discharge from the top at a remote side to minimize "short-circuiting" (i.e. particles traveling directly from feed to discharge without participating in the intended bed reaction). When particles feed from a non-fluidized source, common practices are to feed them either with a screw conveyor or with a dip pipe into which they are metered by a table feeder, star valve, or vibratory feeder, but such practices have disadvantages. Screw conveyors are difficult to seal against elevated pressures often encountered in fluidized beds and are not mechanically dependable when particles are at high temperatures. Particles tend to bridge over in conventional closed dip pipes and thus plug the pipe. Another possibility has been to split the bed with a vertical baffle and feed one side from an open pipe and discharge from the other side. The baffle changes the intended height-to-diameter ratio and hence interferes with proper fluidization, particularly in small diameter beds.

An object of the present invention is to provide an improved feed device which overcomes the foregoing disadvantages of feed devices commonly used.

A further object is to provide an improved dip pipe feed device which overcomes the tendency of particles to bridge over and plug the pipe.

A more specific object is to provide an improved dip pipe feed device in which the pipe has gas escape means of critical size and location to enable fluidizing gas to enter and fluidize particles within the pipe.

In accomplishing these and other objects of the invention, I have provided improved details of structure, preferred forms of which are shown in the accompanying drawing, in which:

Figure 1 is a somewhat diagrammatic vertical sectional view of a vessel equipped with a feed device constructed in accordance with my invention; and Figure 2 is a similar view showing a modification.

Figure 1 shows a conventional closed vessel 10 which contains a horizontal perforate partition 12. A bed B of fluidized particles is supported on said partition. Fluidizing gas enters the bottom of the vessel, as indicated schematically at 13, flows upwardly through the partition and bed, and discharges from the top of the vessel, as indicated schematically at 14. In practice the gas discharge would be equipped with suitable dust collecting means, not shown in the interest of simplicity. Particles feed to bed B through a conventional metering device 15 and a dip pipe 16 constructed according to my invention and hereinafter described. The dip pipe is located adjacent the left side of the reactor and extends to a point near the bottom of bed B. Particles discharge from the top of the bed through a conventional overflow pipe 17 located at the right remote from the dip pipe. The overflow pipe is equipped with a valve 18.

In accordance with my invention, the dip pipe 16 contains a plurality of openings 19 located within vessel 10 above the upper face of bed B. Fluidizing gas flows upwardly through the dip pipe and escapes through openings 19 back into the vessel. Thus the gas maintains particles within the pipe as a fluidized column B1, whereby bridges or plugs do not form, and the flow of particles into bed B is smooth and uninterrupted. To prevent particles from spilling out the openings 19, these openings must be located some distance above the height of the fluidized column B1. This column assumes a level such that the pressure drop in the dip pipe between the bottom and the openings 19 is the same as the pressure drop through the main portion of bed B. The total area of the openings need not exceed the internal cross-sectional area of the dip pipe, and as a practical minimum should not be less than half this area, although smaller areas are not altogether inoperable. Each opening should be large enough that it does not become plugged. Preferably the openings are circular to afford the greatest area per unit of circumference.

Figure 2 shows a modification in which the upper portion of the dip pipe is equipped with a bleed pipe 20 to enable gas to escape. The bleed pipe carries an adjustable valve 21 to regulate the pressure drop of gas flowing through the dip pipe.

From the foregoing description it is seen that either embodiment of my invention affords a simple means for preventing particles from plugging a dip pipe as they feed into a fluidized bed. Both embodiments enable a portion of the fluidizing gas in the bed to flow up the dip pipe and escape therefrom, thus maintaining a fluidized column within the dip pipe.

While I have shown and described certain preferred embodiments of my invention, it is apparent that other modifications may arise. Therefore, I do not wish to be limited to the disclosure set forth but only by the scope of the appended claims.

I claim:

1. In a vessel which includes a perforate horizontal partition adapted to support a fluidized bed of particles, inlet and discharge means for a fluidizing gas, and means for discharging particles from the bed, the combination with said vessel of a device for feeding particles from an external non-fluidized source to said vessel comprising a dip pipe extending into the space normally occupied by the bed and means for metering particles into said dip pipe, said dip pipe having gas escape means enabling fluidizing gas to flow upwardly through the dip pipe and maintain a column of articles therein in a fluidized state, said escape means being located above the height which the column assumes.

2. A combination as defined in claim 1 in which said escape means includes openings in said dip pipe located within said vessel.

3. A combination as defined in claim 1 in which said escape means includes a bleed pipe connected with said dip pipe and located above said vessel.

4. In a vessel which includes a perforate horizontal partition adapted to support a fluidized bed of particles, inlet means below said partition for admitting a fluidizing gas, gas discharge means means above the space normally occupied by a bed supported on said partition, and means for discharging particles from the bed, the combination with said vessel of a device for feeding particles from an external non-fluidized source to said vessel comprising a substantially vertical dip pipe extending from outside said vessel to a point near the bottom of the space normally occupied by the bed, and a metering device at the top of said dip pipe, said dip pipe having gas escape means enabling fluidizing gas to flow therethrough to maintain a fluidized column of solids therein, said escape means being located above the level of the column and furnishing an opening whose minimum area equals half the internal cross-sectional area of said dip pipe and whose maximum area equals the internal cross-sectional area of said dip pipe.

5. A combination as defined in claim 4 in which said escape means includes openings in said dip pipe located within said vessel.

6. A combination as defined in claim 4 in which said escape means includes a bleed pipe connected with said dip pipe and located above said vessel.

References Cited in the file of this patent

UNITED STATES PATENTS

| | | |
|---|---|---|
| 2,715,548 | Fish | Aug. 16, 1955 |
| 2,726,136 | Davis | Dec. 6, 1955 |
| 2,801,136 | Haddad | July 30, 1957 |

UNITED STATES PATENT OFFICE
CERTIFICATION OF CORRECTION

Patent No. 2,972,501                            February 21, 1961

Jerome Feinman

It is hereby certified that error appears in the above numbered patent requiring correction and that the said Letters Patent should read as corrected below.

Column 2, line 54, for "articles" read -- particles --.

Signed and sealed this 8th day of August 1961.

(SEAL)
Attest:

ERNEST W. SWIDER                                 DAVID L. LADD
Attesting Officer                                    Commissioner of Patents